3,136,334
FLUID FLOW NON-RETURN VALVE

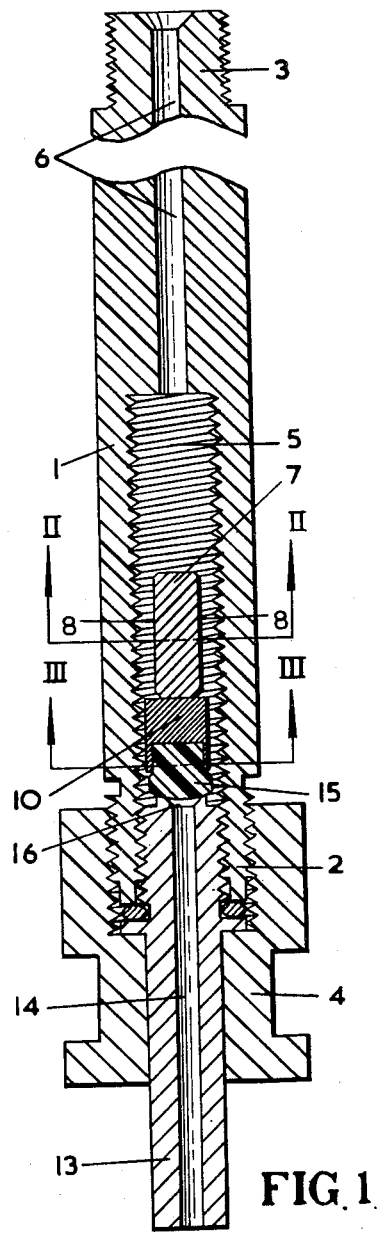
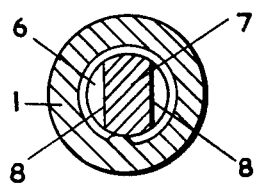
FIG. 2
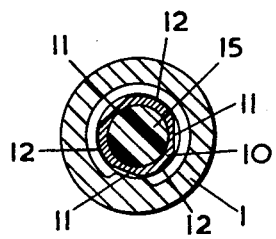
FIG. 3.
FIG. 1.

Offley Jeffrey Dobson and Colin Henry Smith, London, England, assignors to Dunedin Engineering Company Limited, London, England
Filed July 5, 1962, Ser. No. 207,567
Claims priority, application Great Britain July 8, 1961
1 Claim. (Cl. 137—533.19)

The invention relates to a fluid flow non-return valve and is particularly, but not exclusively, concerned with a non-return valve which is to be positioned between an engine cylinder and a pressure gauge, for the purpose of measuring pressure in the cylinder.

According to the invention, a non-return valve comprises a tubular housing having a cylindrical bore therein, a valve member in the form of a block arranged co-axially within the bore and freely movable axially therein into and out of sealing engagement with a seat provided by the adjacent end of a plug-like member, having a through-way therein and engageable with the cylindrical wall of the bore, the valve member having at least three flat side faces arranged substantially parallel with the axis of the bore, whereby fluid flowing through the valve in one direction will lift the valve member off the seat and will flow through the spaces, between the flat side faces of the valve member and the cylindrical wall of the bore, and fluid pressure acting in the reverse direction will hold the valve member against the seat and so prevent flow through the valve.

The housing may also contain a second plug-like member, which, in use, is positioned in the bore adjacent the end of the valve member remote from the first plug-like member, providing the valve seat, the said second plug-like member being adjustable axially of the bore to control the extent of the axial movement of the valve member, a path being provided for fluid flow past the said second plug-like member.

At least the end portion of the valve member engageable with the seat may be made of a deformable material, whereby fluid pressure acting on the valve member in the valve-closing direction will cause the said end portion to be pressed against the seat and thereby to be deformed into sealing engagement with the seat. For example, the end portion may be of cup-shape and contain an insert, made of the said deformable material and extending beyond the lip of the said end portion of the valve member. Alternatively, at least the seat-forming portion of the plug-like member, providing the seat, may be made of a deformable material, whereby fluid pressure acting on the valve member in the valve-closing direction, will cause the valve member to deform the seat into sealing engagement therewith.

As aforesaid, the non-return valve may be used in combination with a pressure gauge for measuring pressure in an engine cylinder; but the non-return valve may also be used in combination with a pressure gauge for measuring fluid pressure in a tank e.g., a compressed air reservoir. Accordingly, the housing of the non-return valve may have connecting means at the inlet and outlet ends thereof for connection respectively with an engine cylinder or tank, containing a fluid of which the pressure is to be measured, and a pressure gauge.

By way of example, one form of non-return valve according to the invention will now be described with reference to the accompanying drawings, in which:

FIGURE 1 is an axial section through a pressure probe, incorporating the said valve and intended for insertion into a cylinder head of a fuel injection engine, in place of a fuel injector, or into a tank containing fluid under pressure;

FIGURE 2 is a section on the line II—II in FIGURE 1, and

FIGURE 3 is a section of the line III—III in FIGURE 1.

The probe comprises a tubular housing 1 of cylindrical shape and having an external screw-thread at the inlet end 2 thereof for connection to a fitting 4 to be inserted into the engine cylinder or tank and an external screw-thread at its outlet end 3 for connection to a pressure gauge (not shown). The housing 1 contains an internally-screw-threaded socket 5 open to the inlet end 2 and communicating with the outlet end 3 through a central through-way 6. The socket 5 and the through-way 6 together form the aforesaid cylindrical bore. An externally screw-threaded plug-like member 7 (i.e., the said second plug-like member) is fitted in the socket 5 and has two flat side surfaces 8 (see FIGURE 2) formed thereon to permit the flow of fluid between the said surfaces and the threaded internal surface of the socket 5 to the through-way 6. Next a valve member 10 in the form of a block having three flat side faces 11 separated by part-cylindrical surfaces 12 (see FIGURE 3) is inserted into the socket, co-axially therewith. Then an externally screw-threaded tubular plug-like member 13 (i.e., the said first plug-like member) is screwed into the socket 1 to close it, except for a central through-way 14 in the member 13. The valve member 10 has a substantially flat end face engageable with the adjacent end face of the said second plug-like member 7. The end of the valve member 10 adjacent the said first plug-like member 13 is of cup-shape and has bonded therein an insert 15 of a deformable material, which extends beyond the lip of the cup. The adjacent end face of the member 13 has a depression 16 formed therein to provide a seat for the insert 15. When the valve member 10 is pushed by fluid pressure towards the member 13, the insert 15 is deformed and so provides good sealing engagement with the depression 16.

To assemble the valve, the said second plug-like member 7 is screwed into the socket 5 and is so adjusted in its axial position as to leave sufficient space for the valve member 10 and the said first plug-like member 13 and to allow the valve member 10 a limited extent of axial movement. Then the valve member 10 together with its insert, and the member 13 are arranged in position. The inlet end 2 of the housing 1 is screwed into the fitting 4, which is sealingly inserted into a hole in the cylinder head of an engine, for example. The outlet end 3 of the housing 1 is connected to a pressure gauge. The compression pressure in the engine cylinder will cause working fluid to flow from the cylinder, through the through-way 14 in the member 13. Thus the valve member 10 will be lifted from its seat, thereby allowing the working fluid to flow through the spaces between the flat side faces 11 of the valve member 10 and the wall of the socket 5, past the flat faces 8 of the member 7 and into the through-way 6. Hence the pressure gauge will indicate the compression pressure. When the pressure in the cylinder drops, the fluid pressure in the pressure gauge will act on the valve member 10 and will move it into sealing engagement with its seat. The pressure gauge will then retain the reading of the compression pressure until the fluid pressure in the gauge has been released.

Although the valve member described in the foregoing example is in the form of a block having three flat side faces separated by part-cylindrical faces, it may be of prismatic shape, having three or more flat side faces or facets extending substantially parallel with the axis of the cylindrical bore in the housing.

Although the valve member described in the foregoing example includes a deformable insert, the whole member may be made of a deformable material. Alternatively, at least the seat-forming portion of the said first plug-like member may be made of a deformable material.

Where the valve is to be used for indicating the firing pressure in an engine cylinder, it is desirable to place a flame trap between the valve member 10 and the engine cylinder. The flame trap may for example be a cylindrical metal plug having a plurality of small holes therein, extending parallel with its axis. Alternatively the holes in the plug may not extend axially from one end of the plug to the other end. Instead the plug may have a stub hole or holes at each end thereof, communicating with radially-extending holes, communicating with an annular passage around the plug. Thus hot gases from the cylinder will have to flow radially into the annular passage, then axially through the passage and then radially back into outlet holes in the plug, before reaching the valve member.

What we claim as our invention and desire to secure by Letters Patent of the United States is:

A non-return valve comprising a tubular housing, having an elongated cylindrical bore therein; fluid inlet means at one end of said bore; fluid outlet means at the other end of said bore; the wall of said bore having screw-threads; two plug-like members spaced apart axially in said bore and each having a flow path therethrough, communicating respectively with said inlet and said outlet means, said plug-like members being insertable into said bore at said inlet end and having portions of the same diameter provided with screw threads engaging those of the wall of said bore, a valve member in the form of a block arranged co-axially within the bore between said plug-like members, said plug-like member adjacent said inlet means forming a seat for said valve member, said valve member being freely movable axially within said bore into and out of engagement with said seat and having at least three flat side faces, arranged substantially parallel with the axis of said bore and at least the end portion of said valve member engageable with said seat being of deformable material, whereby fluid flowing from said inlet means to said outlet means will lift said valve member off said seat and will flow through spaces between said flat side faces and the cylindrical wall of said bore and whereby fluid pressure acting in the reverse direction will hold said valve member against said seat; thereby deforming said end portion into sealing engagement with said seat and thereby preventing flow of fluid through said valve from said outlet means to said inlet means, and said plug-like member adjacent said outlet means having a portion of its threads cut away to provide a passageway between its ends and being adjustable axially in said bore by means of its screw threads to control the extent of the axial movement of said valve member.

References Cited in the file of this patent
UNITED STATES PATENTS

| | | |
|---|---|---|
| 204,687 | Shlaudeman | June 11, 1878 |
| 209,740 | Williams | Nov. 5, 1878 |
| 1,497,726 | Keenan | June 17, 1924 |
| 1,913,116 | Haimbaugh | June 6, 1933 |
| 2,280,411 | Kiene | Apr. 21, 1942 |
| 2,608,865 | Morgan | Sept. 2, 1952 |

FOREIGN PATENTS

| | | |
|---|---|---|
| 786,794 | Great Britain | Nov. 27, 1957 |
| 92,836 | Norway | Sept. 13, 1958 |